(12) United States Patent
Westphal

(10) Patent No.: US 12,056,734 B2
(45) Date of Patent: Aug. 6, 2024

(54) SYSTEM AND METHOD FOR PROVIDING PERSONALIZED SEARCH RESULTS

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 470 days.

(21) Appl. No.: 15/081,153

(22) Filed: Mar. 25, 2016

(65) Prior Publication Data

US 2016/0203515 A1 Jul. 14, 2016

Related U.S. Application Data

(63) Continuation of application No. 13/091,919, filed on Apr. 21, 2011, now abandoned.

(51) Int. Cl.
G06F 16/00 (2019.01)
G06F 16/9535 (2019.01)
G06Q 30/0251 (2023.01)

(52) U.S. Cl.
CPC ..... *G06Q 30/0256* (2013.01); *G06F 16/9535* (2019.01); *G06Q 30/0257* (2013.01); *G06Q 30/0271* (2013.01)

(58) Field of Classification Search
CPC ...... G06Q 10/107; G06Q 30/02; G06Q 40/00; G06Q 30/0251; G06Q 20/102; G06Q 20/10; G06Q 20/40; G06Q 30/06; G06Q 20/382; G06Q 20/3821; G06Q 20/401; G06Q 20/40145; G06Q 30/018; G06Q 30/0277; G06Q 30/0645; G06Q 40/025; G06Q 40/06; G06F 3/0482; G06F 17/272; G06F 2203/04803; G06F 3/04883; G06F 17/30424; G06F 21/6218; G06F 3/017; G06F 3/04886; G06F 17/30867; G06F 21/32; G06F 21/6227; G06F 21/6245;
(Continued)

(56) References Cited

U.S. PATENT DOCUMENTS 7,533,113 B1 * 5/2009 Haddad ................ G06Q 30/02
7,979,495 B2 * 7/2011 Radenkovic ......... G06Q 10/107
709/202

(Continued)

*Primary Examiner* — Yicun Wu
(74) *Attorney, Agent, or Firm* — Greenberg Traurig, LLP

(57) ABSTRACT

Personalized search results are provided to a user by sending to the user a direct marketing email having associated therewith one or more opt-out elements. Information related to the user's interaction with the one or more opt-out elements is maintained in a database. When a search request is thereafter submitted to a search engine by the user, the information related to the user's interaction with the one or more opt-out elements is used to inhibit inclusion within the search results of one or more items. In addition or alternatively, when the user accesses a search interface having a plurality of search options selectable to provide a search request to the search engine, the information related to the user's interaction with the one or more opt-out elements is used to inhibit inclusion within the search interface of one or more of the plurality of user selectable search options.

10 Claims, 3 Drawing Sheets

(58) Field of Classification Search
CPC ........... G06F 17/2705; G06F 17/30699; G06F 17/30702; G06F 17/3089
See application file for complete search history.

(56) References Cited

U.S. PATENT DOCUMENTS

| | | | | |
|---|---|---|---|---|
| 8,296,378 | B2 * | 10/2012 | Huynh | H04L 29/06 |
| | | | | 709/206 |
| 8,312,009 | B1 * | 11/2012 | Bostock | G06F 17/30867 |
| | | | | 707/723 |
| 2007/0180031 | A1 * | 8/2007 | Stern | G06Q 10/107 |
| | | | | 709/206 |
| 2008/0270538 | A1 * | 10/2008 | Garg | H04L 67/55 |
| | | | | 705/26.1 |

* cited by examiner

SYSTEM AND METHOD FOR PROVIDING PERSONALIZED SEARCH RESULTS

RELATED APPLICATION INFORMATION

This application claims the benefit of and is a continuation of U.S. application Ser. No. 13/091,919, filed on Apr. 21, 2011, the disclosure of which is incorporated herein by reference in its entirety.

BACKGROUND

Systems and methods that function to provide personalized search results are generally known. By way of example, U.S. Pat. No. 7,827,135 describes a system in which a user provides feedback on the quality of a provided search result by rating how well the search result meets his or her search criteria. The system then facilitates personalization of future search results based on this feedback. Alternatively, U.S. Pat. No. 7,849,089 describes a system in which personalized search results are provided by using webpage click-through history information to determine a probability that documents in a future search result will be relevant to a user. Still further, US Published Application No. 2005/0278317 describes a system in which search results are personalized by using user demographic information and observed information which includes an analysis of documents on the user's computer system, previous search history, and previous URL visitation history.

While such systems generally work for their intended purpose, a need exists for a system that provides personalized search results by using more meaningful information that can be more readily obtained from users.

SUMMARY

The following generally describes a system and method for providing personalized search results. More particularly, personalized search results are provided to a user by sending to the user a direct marketing email having one or more associated opt-out elements. Information related to the user's interaction with the one or more opt-out elements is tracked and maintained in a database. When a search request is submitted to a search engine by the user, the information related to the user's interaction with the one or more opt-out elements is used to inhibit inclusion within the search results of one or more items, e.g., products within an electronic product catalog of an on-line vendor. In addition or alternatively, when the user accesses a search interface having a plurality of search options selectable to provide a search request to the search engine, the information related to the user's interaction with the one or more opt-out elements is used to inhibit inclusion within the search interface of one or more of the plurality of user selectable search options.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
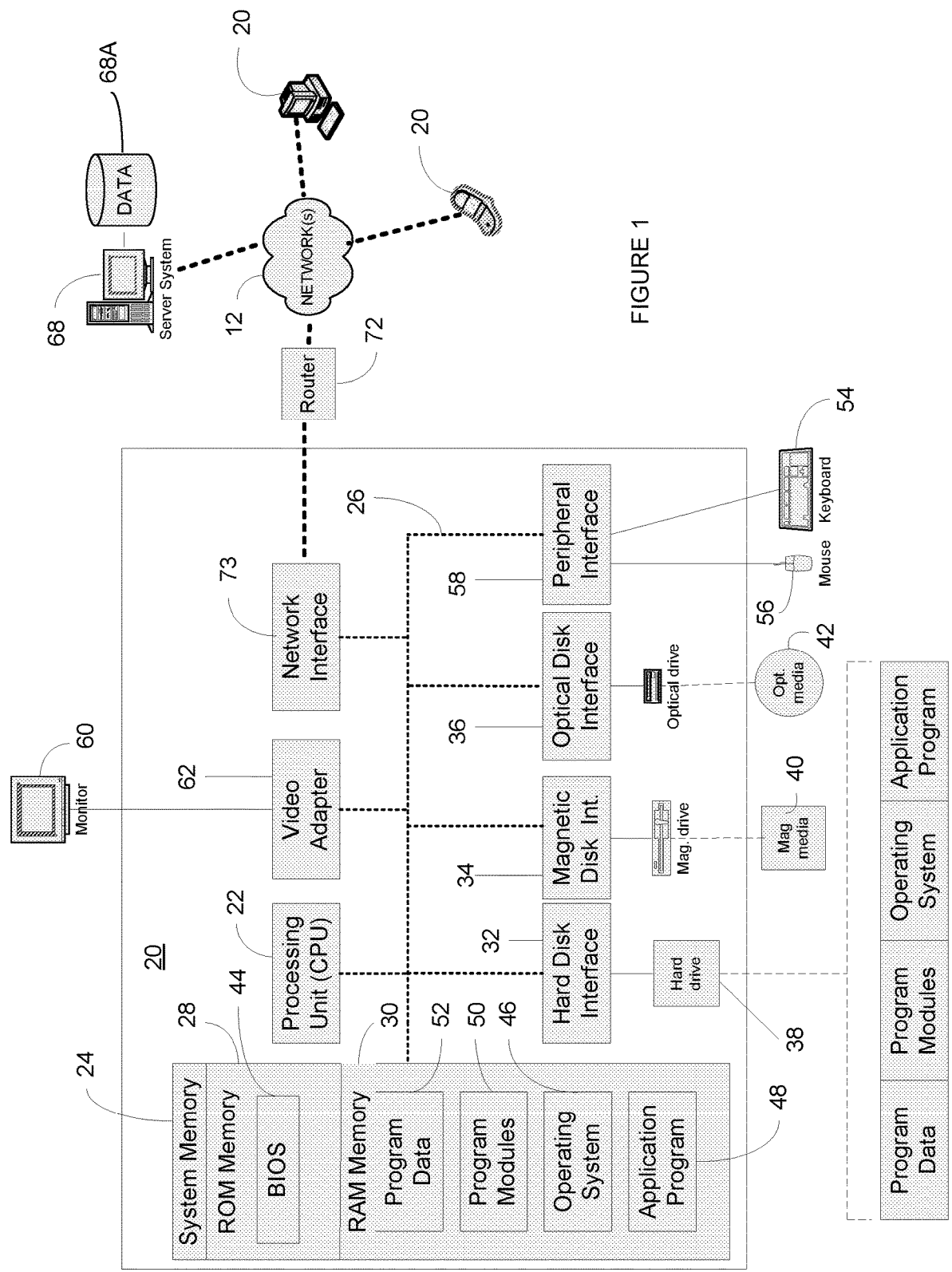
FIG. 1 is a block diagram illustrating components of an exemplary network system in which the subject method may be employed.
Figure 2:
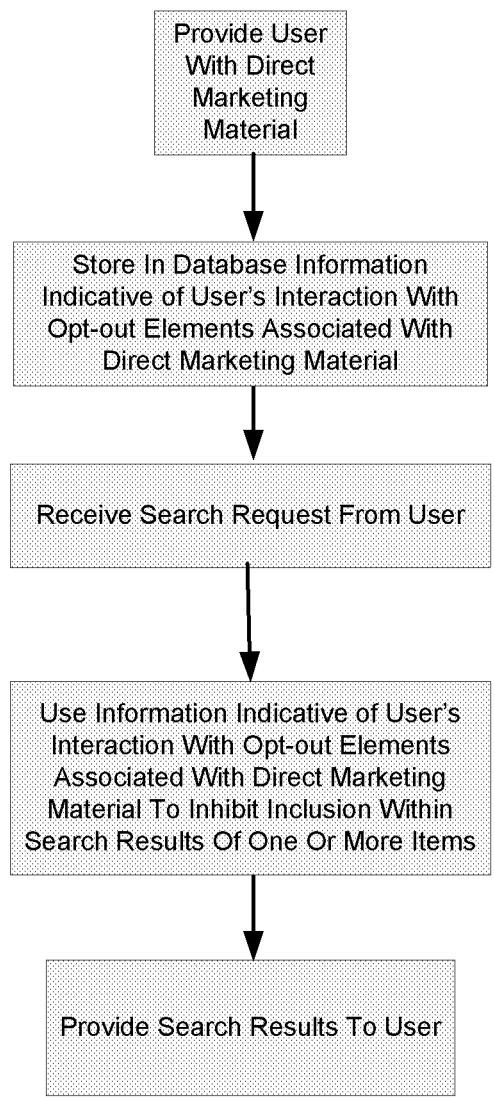
FIG. 2 is a flow chart illustrating steps of an exemplary method for providing personalized search results through use of opt-out information obtained from direct marketing emails.
Figure 3:
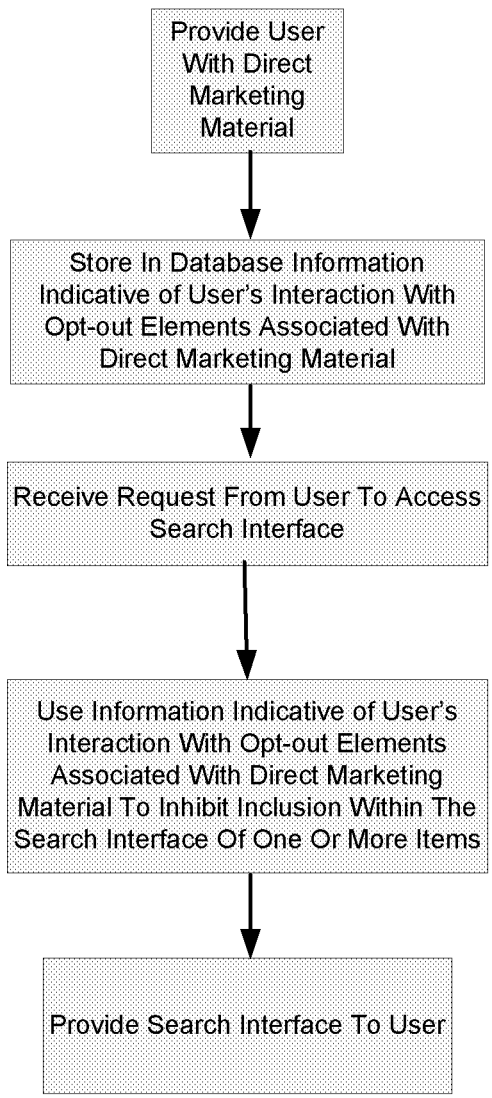
FIG. 3 is a flow chart illustrating steps of another exemplary method for providing personalized search results through use of opt-out information obtained from direct marketing emails.

With reference to the figures, a system and method is hereinafter described for providing personalized search results wherein the search results are personalized by using opt-out information that is associated with direct marketing materials sent to a user, such as emails. While not intended to be limiting, the system and method will be described in the context of a plurality of processing devices linked via a network, such as a local area network or a wide area network, as illustrated in FIG. 1. In this regard, a processing device 20, illustrated in the exemplary form of a computer system, is provided with executable instructions to, for example, provide a means for a consumer, i.e., a user, to access a remote processing device, i.e., a server system 68, via the network to, among other things, perform a search via use of a search engine supported by the remote processing device to obtain search results. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the non-volatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nanodrives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

An end-user, e.g., a consumer, may interact with provided content (e.g., emails), enter commands and information into the processing device 20 (e.g., a search query), etc. through input devices such as a touch screen or keyboard 54 and/or a pointing device 56. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the server system 68 having one or more associated data repositories 68A, e.g., storing a database of product information, user related information (such as opt-out information obtained for a user), etc. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network. Additionally, the server system 68 may have logical connections to other third party server systems via the network 12 and, via such connections, will be associated with data repositories that are associated with such other third party server systems.

For performing tasks as needed, the server system 68 may include many or all of the elements described above relative to the processing device 20. By way of further example, the server system 68 includes executable instructions stored on a non-transient memory device for, among other things, handling search requests, providing search results, providing access to context related services, sending emails, obtaining opt-out information from users interacting with emails, etc.

Communications between the processing device 20 and the server system 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the server system 68.

More particularly, to provide personalized search results to a known user of the system, e.g., a user having information that is linked to an account number, email address, cookie, or other identifier known to the system, the system sends to the user, e.g., to an email account linked to that user, promotional or direct marketing materials. In this regard, the direct marketing materials, which may in the form of a coupon, discount offer, informational flier, etc., will further have an associated mechanism by which the receiving user can opt-out from receiving future direct marketing materials of a specified nature as described further below. The mechanism for opting-out may include a link within the email, a direction to reply to the sent direct marketing material (e.g., a direction to provide a given subject line in a return email), and the like without limitation. The database, particularly the information associated with a relevant user, will then be updated to include the opt-out history information of that user, e.g., the system will track the types/categories of opt-outs that have been returned to the system by the user as well as the types/categories of direct marketing materials that the user has been sent—which also allows the system to track the types/categories of direct marketing materials the user has not affirmatively opted-out from receiving in the future. It is to be understood that, in certain circumstances, the user may be a member of a group, e.g., a collection of "friends" in a social network, and opt-out information obtained from other users within the group to which user belongs can thus be considered as being provided by the user himself/herself. Thus, the term "user" as used herein is contemplated to include the user himself/herself as well as others known to be related to the user, if applicable.

More particularly, to provide personalized search results a user is preferably sent direct marketing materials having opt-out options for one or more types/categories of information. In the context of an on-line merchant, the types/categories can be related to types/categories of products. By way of non-limiting example, if a direct marketing email contains information relevant to one or more products within a product category, such as gardening supplies and equipment, the user would be allowed to opt-out of receiving any further direct marketing emails for this particular product category by clicking on a link having an appropriate label, such as "I no longer wish to receive emails with products from this category." In response to the user selecting this opt-out option, the on-line merchant would update their database(s) to reflect the user's desire to no longer receive promotional materials for products within the specified product category.

It will be appreciated that, associated with any given direct marketing email multiple opt-outs may be provided each directed to a particular product category/type, a particular product sub-category/sub-type, etc. For example, an email can be sent to a user which notes that "This email promotion contains products from the rechargeable battery category, the LED flashlight category, and outdoor safety equipment. Please clink on the links which correspond to product categories for which you no longer wish to receive email promotions." As will also be appreciated, the opt-outs may be varied in scope as desired.

Still further, when a user elects to opt-out from receiving promotional email of a general nature, the system may respond by providing additional opt-out options to a user to thereby elicit more detail opt-out information from that user. For example, the system may traverse a category/product hierarchy (such as a tree hierarchy) and provide opt-out options for nodes above and/or below the opt-out that was the subject of the originally provided promotion email. The further provided opt-outs are preferably within a given number of nodes from a prior provided opt-out to thereby keep the opt-outs somewhat contextually related. As will be further appreciated, this process may be repeated until such time as the user indicates that no further opt-outs are desired. The opt-out information gathered in this manner may then be used to provide personalized search results as herein described.

With the opt-out information obtained from a user in this manner, the on-line vendor can then alter the behavior of the product search engine, i.e., the product search engine can consider the opt-out related information obtained from a user to thereby provide personalized search results. Again, by way of non-limiting example, in the event that a known user provides a search request to a search engine, e.g., the user submits a search request for "hoses," and the database has stored therein information that indicates that the user has opted-out from receiving promotion materials related to gardening supplies and equipment, the results of the search request as provided by the search engine may now exclude any products, literature, etc. that has been tagged as falling within the category of gardening supplies and equipment, e.g., products tagged as being "garden hoses" would be excluded from the search while other products, such as "pneumatic hoses," might still be included in the search results that are provided to this user. While the inclusion of items within search results may be inhibited by means of exclusion, it is also contemplated that the inclusion of items with search results may be inhibited by placing the items lower in an ordering of a listing of items returned as a result of a search request.

Furthermore, the same information may be utilized to provide personalized search results by limiting search selection options that are initially presented to a user, for example via a drill-down search interface. In this example, the drill-down search interface of a known user which has opted-out from receiving promotional materials related to gardening supplies and equipment would not be provided with any drill-down search links having options related to gardening supplies and equipment. In this manner, the information collected from a user by means of the direct marketing materials may be used to provide a search interface that would be less cluttered and, accordingly, the drill-down experience for this user would be improved.

It will additionally be appreciated that the database of the on-line merchant could be updated to indicate a preference by the user for products within a specified product category/type in the event that the user does not opt-out within a predetermined period of time after having been sent the promotional materials related to that product category/type. In this manner, such preference information may be used to promote one or more products returned to a user in response to a submitted search query, e.g., promoted products may be elevated, highlighted, etc. within returned search results. The inferred preference information obtained from a user not interacting with an opt-out may similarly be utilized to promote certain selectable options within a drill-down to a user upon their accessing the search interface.

While various concepts have been described in detail, it will be appreciated by those skilled in the art that various modifications and alternatives to those concepts could be developed in light of the overall teachings of the disclosure. For example, while described in the context of a networked system, it will be appreciated that the search engine functionality can be included on the search query receiving computer itself. Similarly, while described in the context of using opt-out related information to influence search results and/or a search interface, such information may also be utilized to provide relevant product recommendations to a user, e.g., products that a user has no interest in based upon the collected opt-out information may be filtered from product recommendations provided in the manners described in commonly owned U.S. Pat. No. 7,343,326. Still further, while described in the context of a user opting out from product categories, opt-outs can also be provided for product brands, for product parameters (e.g., made in China, 220 volt, price, etc.), and the like, whereby such additional opt-out information could also be used in accordance with the descriptions provided herein. Yet further, the personalized search results and/or search interfaces can be further personalized whereby products and/or search terms for accessories related to products and/or product categories, etc. that the user has opt-out of are inhibited from being included in search results and/or a search interface. It will also be appreciated that a list of opted-out categories/sub-categories for a known user can be maintained in the event that the user wishes to resume receiving emails (and accordingly reset the search results/search interface personalization effects) for a previously opted-out product category/sub-category. Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method for providing personalized search results, the method comprising:
receiving at a search engine from a user device associated with a one of the plurality of users a search request for searching an electronic catalog;
using by the search engine the provided search request to generate an electronic search result comprised of a plurality of product information and a data related to interaction by the one of the plurality of users with a one or more opt-out elements associated with a direct marketing email to generate a modified electronic search result in which one or more of the plurality of product information is caused to be excluded from the electronic search result; and causing the search engine to electronically transmit the modified electronic search result to the user device for display on a display associated with the user device as a response to the received search query.

2. The method as recited in claim 1, wherein the direct marketing email comprises a promotional offer for a product within a particular category or subcategory of product, the plurality of product information is provided with tags corresponding to the particular category or subcategory of product, and the search engine uses the tags to generate the modified electronic search result.

3. The method as recited in claim 1, wherein the data related to interaction by the one of the plurality of users with a one or more opt-out elements associated with a direct marketing email is cross-referenced to a purchasing account number that is associated with the one of the plurality of users.

4. The method as recited in claim 1, wherein the data related to interaction by the one of the plurality of users with a one or more opt-out elements associated with a direct marketing email is cross-referenced to an email address that is associated with the one of the plurality of users.

5. The method as recited in claim 1, wherein the data related to interaction by the one of the plurality of users with a one or more opt-out elements associated with a direct marketing email is cross-referenced to an identifier extracted from a cookie placed on the user device.

6. A method for providing personalized search results, the method comprising:

receiving at a search engine from a user device associated with a one of the plurality of users a search request for searching an electronic catalog;

using by the search engine the provided search request to generate an electronic search result comprised of a plurality of product information arranged to have a first order of display and a data related to interaction by the one of the plurality of users with a one or more opt-out elements associated with a direct marketing email to generate a modified electronic search result in which the plurality of product information is caused to be rearranged to have a second order of display different than the first order of display; and causing the search engine to electronically transmit the modified electronic search result to the user device for display on a display associated with the user device as a response to the received search query.

7. The method as recited in claim 6, wherein the direct marketing email comprises a promotional offer for a product within a particular category or subcategory of product, the plurality of product information is provided with tags corresponding to the particular category or subcategory of product, and the search engine uses the tags to generate the modified electronic search result.

8. The method as recited in claim 6, wherein the data related to interaction by the one of the plurality of users with a one or more opt-out elements associated with a direct marketing email is cross-referenced to a purchasing account number that is associated with the one of the plurality of users.

9. The method as recited in claim 6, wherein the data related to interaction by the one of the plurality of users with a one or more opt-out elements associated with a direct marketing email is cross-referenced to an email address that is associated with the one of the plurality of users.

10. The method as recited in claim 6, wherein the data related to interaction by the one of the plurality of users with a one or more opt-out elements associated with a direct marketing email is cross-referenced to an identifier extracted from a cookie placed on the user device.

\* \* \* \* \*